United States Patent [19]

Sielemann et al.

[11] Patent Number: 5,664,321
[45] Date of Patent: Sep. 9, 1997

[54] PROCESS FOR THE PRODUCTION OF A LEAD ACCUMULATOR

[75] Inventors: Olaf Sielemann, Kefenrod; Harald Niepraschk, Budingen; Peter Nemec-Losert, Hirzenhain, all of Germany

[73] Assignee: Compagnie Europeenne d'Accumulateurs, Cedex, France

[21] Appl. No.: 622,374

[22] Filed: Mar. 27, 1996

[30] Foreign Application Priority Data

Apr. 8, 1995 [DE] Germany .................. 195 13 343.9

[51] Int. Cl.$^6$ .................................................. H01M 10/12
[52] U.S. Cl. ........................................... 29/623.1; 429/190
[58] Field of Search ......................... 429/190; 29/623.1; 205/57, 63, 67, 351

[56] References Cited

U.S. PATENT DOCUMENTS 4,687,718  8/1987  Chreitzberg et al. .................. 429/190

FOREIGN PATENT DOCUMENTS

| | | |
|---|---|---|
| 0491150 | 6/1992 | European Pat. Off. . |
| 0374187 | 10/1994 | European Pat. Off. . |
| 3521200 | 12/1986 | Germany . |
| 3644420 | 6/1988 | Germany . |
| 4202497 | 8/1993 | Germany . |

*Primary Examiner*—Anthony Skapars
*Attorney, Agent, or Firm*—Michael L. Dunn

[57] ABSTRACT

A process for the production of a lead accumulator comprising installing electrode plates and separators in a battery box, introducing an electrolyte in the form of a thixotropic gel including sulphuric acid and gel-forming agent into an electrolyte space and, closing of the battery box, wherein after installing the electrode plates the entire amount of sulphuric acid required for a desired electrolyte concentration is introduced into an electrolyte space within the box to form the electrode plates and after formation, an aqueous silica sol with 15 to 60% by weight of solids component, with a specific surface area of solids of 100 to 500 m$^2$/g, is added in such an amount that a solids concentration of the electrolyte, with respect to the overall weight thereof, of 3 to 20% by weight is obtained, and then the content of the electrolyte space is homogenously mixed.

34 Claims, No Drawings

PROCESS FOR THE PRODUCTION OF A LEAD ACCUMULATOR

BACKGROUND OF THE INVENTION

The invention concerns a process for the production of a lead accumulator having an electrolyte in the form of a thixotropic gel which as essential constituents includes sulphuric acid and a gel-forming agent.

Such accumulators are independent of position, leak-resistant and maintenance-free and therefore afford advantages over lead accumulators with a liquid electrolyte.

German patent specification No. 3 521 200 describes a process for the production of such lead accumulators, in which, after installation of the electrodes and separators, sulphuric acid which is free from gel-forming agent is firstly poured in in order to completely impregnate the pores of the active materials in the electrodes and the separators and exchange any forming acid which is possibly still present in the pores of the electrodes. Then the excess of that filling electrolyte is completely removed by pouring it out, whereupon the electrolyte space is filled in a second filling step with the electrolyte which is in the form of a thixotropic gel. This process has disadvantages from the point of view of the operating procedure involved as the sulphuric acid has to be completely poured out after the first filling step, which is a tedious operation and which frequently has the result that residues of the filling electrolyte remain in the electrolyte space and only incompletely mix with the thixotropic gel after the latter has been introduced, and therefore give rise to non-homogenous filling of the electrolyte space. In addition, the step of introducing the thixotropic gel which is pre-prepared outside the electrolyte space is a tedious one as it can already revert in the filling operation from the liquefied form to the solid form.

In the process described in German laid-open application (DE-OS) No. 3 644 420 the ripened plates are firstly sulphated in the battery box using gel-free sulphuric acid so that all the sulphuric acid which is required for setting the final acid density of the operating electrolyte is stored as lead sulphate in the active masses of the plates, whereupon the remaining sulphuric acid has to be tipped out in order then to introduce a water/gel-forming agent mixture. Formation of the plates then occurs. That process admittedly eliminates the complicated operation of introducing the thixotropic gel which is produced outside the battery box, but it does not eliminate the step of tipping out surplus sulphuric acid from the sulphating stage. This process also involves the risk of non-homogeneity of the thixotropic gel in the electrolyte space.

The process disclosed in German laid-open application (DE-OS) No. 4 202 497 also involves operating in two steps, wherein in a first step the pores in the active masses in the electrodes and separators are impregnated with sulphuric acid which is free from gel-forming agent and then in a second step the electrolyte space is filled with the electrolyte which is in the form of a thixotropic gel. In the first filling stage the amount of sulphuric acid which is free from gel-forming agent is such that there is no freely movable electrolyte in the cell so that the step of pouring out sulphuric acid is eliminated. It is however difficult to fill all pores without having an excess of sulphuric acid in the first filling stage so that the process is complicated and frequently results in layered and thus non-homogenous filling of the electrolyte space.

Similarly European patent specification No. 0 374 187 concerns a two-stage process in which firstly the ripened plates, after being fitted into the battery box, are wetted and formed with gel-free sulphuric acid, whereupon the surplus acid is tipped out and replaced by a mixture of alkali polysilicate solution with sulphuric acid of appropriate concentration. This process also suffers from the above-indicated disadvantages of two-stage processes.

European laid-open application No. 0 491 150 describes a process in which unformed plates are fitted into the battery box, whereupon the electrolyte space is filled with the dilute sulphuric acid containing gel-forming agents and then the electrode plates are formed. That process is time-consuming and results in non-homogeneity of the gel-like electrolyte.

In U.S. Pat. No. 4,687,718, similarly to German laid-open application (DE-OS) No. 3 644 420, the unformed plates which are fitted into the battery boxes are firstly wetted with sulphuric acid of suitable concentration, whereupon the acid is tipped out and replaced by sulphuric acid containing gel-forming agent. Block box formation is then effected.

All those known processes are carried out in two steps, which involves the disadvantage of dealing with sulphuric acid at a number of points in the operating procedure, possibly with intermediate cleaning steps, and which, due to the required step of tipping out sulphuric acid in the first filling stage, inevitably results in non-homogeneity of the thixotropic gel-like electrolyte in the electrolyte space.

BRIEF DESCRIPTION OF THE INVENTION

Therefore the object of the present invention is to provide a process for the production of a lead accumulator with an electrolyte which occurs in the form of thixotroptc gel, which process avoids the disadvantages of the state of the art, is easier to carry into effect and in particular avoids dealing with sulphuric acid at a plurality of places in the operating procedure and non-homogeneities in the electrolyte space.

That object is attained in accordance with the present invention.

The process according to the invention for the production of a lead accumulator with an electrolyte which occurs in the form of a thixotropic gel and which as essential constituents includes sulphuric acid and a gel-forming agent, with installation of the electrode plates and separators in the battery box, the introduction of sulphuric acid and gel-forming agent into the electrolyte space, and closure of the battery box, is characterized in that firstly after the installation of the electrode plates the entire amount of sulphuric acid required for the desired electrolyte concentration is introduced into the electrolyte space, after formation (treatment) of the electrode plates an aqueous silica sol with 15 to 60% by weight of solids component and a specific surface area of the solid of 100 to 500 $m^2/g$ is added in such an amount that a solids concentration of the electrolyte, with respect to the total weight thereof, of 3 to 20% by weight is obtained, and the content of the electrolyte space is then homogenously mixed.

DETAILED DESCRIPTION OF THE INVENTION

This process has a series of advantages over the state of the art. It does not require any handling of sulphuric acid at a number of points in the operating procedure and it does not involve any interposed cleaning steps. The result obtained is a homogenous composition of the thixotropic gel in the electrolyte space and uniform reproducibility of the electrolyte composition in a production series. The procedure eliminates an undesirable step of tipping sulphuric acid out of the battery, the electrode plates can be formed by tank formation or block box formation, and the pores of the electrode plates are kept gel-free as the gel-forming agent is added only after wetting of the plates with sulphuric acid.

In per se known manner, together with the aqueous silica sol which is added as the gel-forming agent, it is optionally possible to add orthophosphoric acid in a concentration of 1.5 to 5% by weight, with respect to the total weight of the electrolyte, in order to increase the cycle resistance of the accumulator. The aqueous silica sol is desirably added in such an amount that the solids concentration of the electrolyte, with respect to the total weight thereof, is 3 to 20% by weight, preferably 4 to 8% by weight.

When reference is made herein to the fact that the aqueous silica sol is added after formation of the electrode plates, that wording includes both tank formation and also block box formation of the electrode plates. In the case of tank formation the plates are formed prior to installation outside the battery box by treatment with sulphuric acid and are fitted into the battery box, in the wet or dry condition, whereafter the total amount of the sulphuric acid of adequate density that is required is introduced in a condition of being free from gel-forming agent.

Instead it is also possible to effect block box formation of the electrode plates, by a procedure whereby unformed ripened plates are fitted into the battery box and the formation operation is effected by means of a suitable current program in the block box after addition of the total required amount of sulphuric acid, free from gel-forming agent. In that case it is desirable for the sulphuric acid added to contain 1.5 to 20 g/l of sodium sulphate, in order to lower the solubility of the lead sulphate contained in the plates. The current program for the subsequent formation operation in the block box is temperature-controlled and is between 35° and 65° C., preferably at about 45°±5° C. The required formation time can be reduced by cooling measures, preferably using a water bath. After termination of the formation operation, the gel-free sulphuric acid in the battery is of higher density than at the beginning of the formation operation, and that higher density is dependent on the density of the sulphuric acid at the beginning of the formation operation and on the current program used.

The operation of introducing both the sulphuric acid which is free from gel-forming agent and also the liquid aqueous silica sol is a simple and easy one as both materials involve very mobile liquids. Conventional substances can easily be dissolved in relatively low levels of concentration in the aqueous silica sol without limiting the pourability thereof, such as the above-mentioned orthophosphoric acid for increasing cycle resistance and the above-mentioned sodium sulphate for lowering the solubility of lead sulphate and for increasing conductivity and resistance to deep discharging.

Homogenous mixing of the content of the electrolyte space is an essential integer of the process according to the invention in order for the gel-forming agent to be uniformly distributed in the electrolyte. That homogenous mixing operation is desirably effected by rotation of the battery after closing the valve openings. That rotation of the accumulator is desirably effected about its horizontal axis for a period of about 1 to 10 minutes through 1 to 100 revolutions. Instead, but less preferably, homogenous mixing is also achieved by temporary overcharging of the accumulator and the concomitant gas formation which also results in homogenous mixing and rapid gel formation. As however such gas formation may be undesirable from the point of view of the operating procedure involved, as the gases formed have to be removed from the working environment, rotation of the battery with the battery box closed is preferred.

EXAMPLE

An accumulator with a rated voltage of 12 V and a rated capacity of 6.5 Ah was used in a test. The accumulator contained ripened plates and was filled with 75 g/cell of sulphuric acid of a concentration of 38.0% by weight and a content of 7.0 g/l $Na_2SO_4$.

After the temperature-controlled block box formation operation, 10.5 g/cell of aqueous silica sol with a solids content of 40% by weight of $SiO_2$ was added to the accumulator and after provisional closure of the filling openings mixed with the electrolyte in the cells of the accumulator by rotation about the horizontal axis.

After replacement of the provisional closures by the definitive inserts, the electrical power data of the accumulator were ascertained. A conventionally produced accumulator of the same capacity and rated voltage was used for comparison purposes. The value obtained can be found in the following Table.

| Discharge current | % $C_{rated}$ (12 V 6.5 Ah) | % $C_{rated}$(12 V 6.5 Ah) conventional |
| --- | --- | --- |
| $I_{20}$ | 105 | 105 |
| 3.4*$I_{20}$ | 90 | 90 |
| 10*$I_{20}$ | 70 | 70 |
| 20*$I_0$ | 58 | 55 |

The specific power data of the active masses of individual plates of the two test batteries exhibit slight variations, as can be seen from the following Table.

| Discharge # | Specific capacity of the positive mass (conventional = 1) |
| --- | --- |
| 1 | 1.02 |
| 2 | 1.00 |
| 3 | 1.00 |

In the case of the conventionally produced accumulator the electrolyte was produced in the form of a thixotropic gel outside the electrolyte space and introduced in the form of a gel.

What is claimed is:

1. A process for the production of a lead accumulator comprising installing electrode plates and separators in a battery box, introducing an electrolyte in the form of a thixotropic gel including sulphuric acid and gel-forming agent into an electrolyte space and, closing of the battery box, wherein after installing the electrode plates the entire amount of sulphuric acid required for a desired electrolyte concentration is introduced into an electrolyte space within the box to form the electrode plates and after formation, an aqueous silica sol with 15 to 60% by weight of solids component, with a specific surface area of solids of 100 to 500 m²/g, is added in such an amount that a solids concentration of the electrolyte, with respect to the overall weight thereof, of 3 to 20% by weight is obtained, and then the content of the electrolyte space is homogenously mixed.

2. A process according to claim 1 wherein the content of the electrolyte space is homogenously mixed by rotation of the accumulator.

3. A process according to claim 2 wherein the accumulator is rotated 1 to 100 times for a period of 1 to 10 minutes.

4. A process according to claim 1 wherein the content of the electrolyte space is mixed by temporary overcharging of the accumulator and the concomitant gas formation.

5. A process according to claim 1 wherein plates which have already been initially formed are fitted into the battery box.

6. A process according to claim 2 wherein plates which have already been initially formed are fitted into the battery box.

7. A process according to claim 4 wherein plates which have already been initially formed are fitted into the battery box.

8. A process according to claim 1 wherein the operation of forming the plates is effected in the battery box after introduction of the required amount of sulphuric acid.

9. A process according to claim 2 wherein the operation of forming the plates is effected in the battery box after introduction of the required amount of sulphuric acid.

10. A process according to claim 4 wherein the operation of forming the plates is effected in the battery box after introduction of the required amount of sulphuric acid.

11. A process according to claim 6 wherein sulphuric acid with a content of 1.5 to 20 g/l of sodium sulphate is introduced.

12. A process according to claim 1 wherein 1.5 to 5% by weight, with respect to the total weight of the electrolyte, of orthophosphoric acid is added together with the aqueous silica sol.

13. A process according to claim 2 wherein 1.5 to 5% by weight, with respect to the total weight of the electrolyte, of orthophosphoric acid is added together with the aqueous silica sol.

14. A process according to claim 4 wherein 1.5 to 5% by weight, with respect to the total weight of the electrolyte, of orthophosphoric acid is added together with the aqueous silica sol.

15. A process according to claim 5 wherein 1.5 to 5% by weight, with respect to the total weight of the electrolyte, of orthophosphoric acid is added together with the aqueous silica sol.

16. A process according to claim 8 wherein 1.5 to 5% by weight, with respect to the total weight of the electrolyte, of orthophosphoric acid is added together with the aqueous silica sol.

17. A process according to claim 11 wherein 1.5 to 5% by weight, with respect to the total weight of the electrolyte, of orthophosphoric acid is added together with the aqueous silica sol.

18. A process according to claim 1 wherein the aqueous silica sol is added in such an amount that the solids concentration of the electrolyte, with respect to the overall weight thereof, is 3 to 20% by weight.

19. A process according to claim 2 wherein the aqueous silica sol is added in such an amount that the solids concentration of the electrolyte, with respect to the overall weight thereof, is 3 to 20% by weight.

20. A process according to claim 3 wherein the aqueous silica sol is added in such an amount that the solids concentration of the electrolyte, with respect to the overall weight thereof, is 3 to 20% by weight.

21. A process according to claim 4 wherein the aqueous silica sol is added in such an amount that the solids concentration of the electrolyte, with respect to the overall weight thereof, is 3 to 20% by weight.

22. A process according to claim 5 wherein the aqueous silica sol is added in such an amount that the solids concentration of the electrolyte, with respect to the overall weight thereof, is 3 to 20% by weight.

23. A process according to claim 8 wherein the aqueous silica sol is added in such an amount that the solids concentration of the electrolyte, with respect to the overall weight thereof, is 3 to 20% by weight.

24. A process according to claim 11 wherein the aqueous silica sol is added in such an amount that the solids concentration of the electrolyte, with respect to the overall weight thereof, is 3 to 20% by weight.

25. A process according to claim 12 wherein the aqueous silica sol is added in such an amount that the solids concentration of the electrolyte, with respect to the overall weight thereof, is 3 to 20% by weight.

26. A process according to claim 18 wherein the aqueous silica sol is added in such an amount the solids concentration of the electrolyte, with respect to the overall weight thereof, is 4 to 8% by weight.

27. A process according to claim 19 wherein the aqueous silica sol is added in such an amount that the solids concentration of the electrolyte, with respect to the overall weight thereof, is 4 to 8% by weight.

28. A process according to claim 20 wherein the aqueous silica sol is added in such an amount that the solids concentration of the electrolyte, with respect to the overall weight thereof, is 4 to 8% by weight.

29. A process according claim 21 wherein the aqueous silica sol is added in such an amount that the solids concentration of the electrolyte, with respect to the overall weight thereof, is 4 to 8% by weight.

30. A process according to claim 22 wherein the aqueous silica sol is added in such an amount that the solids concentration of the electrolyte, with respect to the overall weight thereof, is 4 to 8% by weight.

31. A process according to claim 23 wherein the aqueous silica sol is added in such an amount that the solids concentration of the electrolyte, with respect to the overall weight thereof, is 4 to 8% by weight.

32. A process according to claim 24 wherein the aqueous silica sol is added in such an amount that the solids concentration of the electrolyte, with respect to the overall weight thereof, is 4 to 8% by weight.

33. A process according to claim 25 wherein the aqueous silica sol is added in such an amount that the solids concentration of the electrolyte, with respect to the overall weight thereof, is 4 to 8% by weight.

34. A process according to claim 2 wherein an electrolyte additive is included; provided that, such additive does not affect the pourability of the aqueous silica sol.

* * * * *

UNITED STATES PATENT AND TRADEMARK OFFICE
CERTIFICATE OF CORRECTION

PATENT NO. : 5,664,321
DATED : September 9, 1997
INVENTOR(S) : Olaf Sielemann, et al.

It is certified that error appears in the above-identified patent and that said Letters Patent is hereby corrected as shown below:

Cancel Claims 18 through 25.

Change the dependency of Claim 26 from "18" to --1--.

Change the dependency of Claim 27 from "19" to --2--.

Change the dependency of Claim 28 from "20" to --3--.

Change the dependency of Claim 29 from "21" to --4--.

Change the dependency of Claim 30 from "22" to --5--.

Change the dependency of Claim 31 from "23" to --8--.

Change the dependency of Claim 32 from "24" to --11--.

Change the dependency of Claim 33 from "25" to --12--.

Signed and Sealed this

Twenty-seventh Day of January, 1998

Attest:

BRUCE LEHMAN

Attesting Officer

Commissioner of Patents and Trademarks